3,719,703

SEPARATION OF SULFONIC ACIDS FROM SULFURIC ACID

James S. Fritz, Ames, Iowa, Robert K. Gillette, Kettering, Ohio, and Donald R. Beuerman, Ames, Iowa, assignors to the United States of America as represented by the United States Atomic Energy Commission
No Drawing. Filed Apr. 29, 1969, Ser. No. 820,318
Int. Cl. C07c 143/24
U.S. Cl. 260—505 P        1 Claim

ABSTRACT OF THE DISCLOSURE

A method of separating aromatic sulfonic acids from sulfuric acid and sulfates contained in an aqueous solution by contacting the solution with a long-chain tertiary aliphatic amine so that the sulfonic acid is taken up by the amine, separating the amine from the aqueous solution and back-extracting the sulfonic acid from the amine.

CONTRACTUAL ORIGIN OF THE INVENTION

The invention described herein was made in the course of, or under, a contract with the United States Atomic Energy Commission.

BACKGROUND OF THE INVENTION

Important to many industries such as the dye industry are large quantities of pure sulfonic acids which are the base for many other chemicals. These sulfonic acids are ordinarily made by contacting an appropriate organic material with a concentrated solution of sulfuric acid and sulfur trioxide, and then separating out the newly formed sulfonic acid from the reaction mixture.

A common method of separation of the acids is to neutralize the reaction mixture with calcium or barium carbonate solution and filter out the insoluble sulfate which is formed. This method requires large amounts of carbonate solution in the neutralization step, which increases the volumes of materials which must be handled, thus increasing their cost. This method also involves the entrainment of the reaction mass by the evolution of carbon dioxide which may result in incomplete separation and loss of some product.

Another method for reducing sulfuric acid contamination of selected sulfonic acids is to add to the mixture an alkanol of from 1 to 4 carbon atoms and distill off the volatile materials which are formed. This process requires considerable care to prevent too much heat from resulting in thermal breakdown of the desired sulfonic acids.

SUMMARY OF THE INVENTION

We have invented a method for separating aromatic sulfonic acids from sulfuric acid and sulfates which eliminates many of the problems mentioned heretofore. The process of this invention comprises contacting the aqueous solution containing the sulfonic acid and sulfuric acid or sulfates with a long-chain tertiary aliphatic amine, mixed with a suitable diluent. The sulfonic acid is taken up by the organic solution of a tertiary amine which is then separated from the aqueous solution. The purified sulfonic acid can then be readily stripped from the amine by known techniques.

It is therefore one object of this invention to provide a method of separating sulfonic acids from sulfuric acids and sulfates.

It is another object of this invention to provide a simple, highly efficient method for purifying sulfonic acids of sulfuric acids and other sulfates with which they may be associated.

DESCRIPTION OF THE PREFERRED EMBODIMENT

These and other objects of the invention can be attained by contacting the aqueous solution containing sulfonic acid and sulfuric acid or sulfates with an organic solution of a long-chain tertiary aliphatic amine, for example, tri-capryl amine, whereby the sulfonic acid or acids present in the aqueous solution are taken up by the amine and form a salt therewith. After separation of the aqueous solution from the amine, the purified sulfonic acid can be back-extracted by contacting the amine solution with an aqueous solution of a strong alkali such as sodium hydroxide which neutralizes the acid and recovers the sulfonic acids as its salt.

The tertiary amine with which the process of this invention may be practiced is any high molecular weight long-chain tertiary aliphatic amine having between 15 and 35 carbon atoms. The amine with which this process was developed and which was used in all examples hereinafter presented was tri-capryl amine which is available under the trade name of Alamine 336. The amine may be in any form which is convenient to use, for example, sulfate, nitrate or chloride.

A wide variety of organic compounds proved satisfactory as a diluent and solvent for the amine, for example, chloroform, ethyl acetate, nitrobenzene, toluene and cyclohexane. In general, any hydrocarbon or chlorinated hydrocarbon in which the tertiary amine is soluble is satisfactory as a diluent.

The amount of tertiary amine in the diluent may vary from 5 to 50% volume/volume (v./v.) and is dependent upon the amount of sulfonic acid which one is seeking to extract from the aqueous solution. The concentration is limited only by the viscosity of the amine being used and greater concentrations than this are possible if adequate phase contact and subsequent separation can be attained. Concentrations of less than 5% v./v. may result in incomplete sulfonic acid extraction.

The amount of sulfonic acids which can be recovered is dependent upon the concentration of tertiary amine in the organic diluent. One mole of amine will recover one mole of a mono-sulfonic acid.

The sulfonic acid may be back-extracted from the amines by methods known to those skilled in the art. For example, the organic phase containing the sulfonic acid can be contacted with an equal volume of a 0.2 M NaOH solution to back-extract the sulfonic acid as its sodium salt. The sulfonic acid salt can then be recovered by evaporation or crystallization.

The amine may be used in several different ways to recover the sulfonic acids. For example, the amine may be dissolved in an appropriate solvent and used to recover the sulfonic acids in a batch separation process. The amine may also be coated upon an inert substrate, placed in a column and used in a column separation procedure.

Two inert granular support materials which were found to be quite satisfactory were Chromosorb W and Teflon. The Chromosorb W which is 80 to 100 mesh, is prepared by adding it to a solution of amine in ethyl ether. This solution is stirred with air passing over it until all of the ether has evaporated. A dry white powder results which is slurried in 2 M hydrochloric acid and added to a glass column, using a glass wool plug as support. 6 M hydrochloric acid is then passed through the column at a flow rate of about 1 ml./min. to prepare the amine hydrochloride. Excess hydrochloric acid is removed with distilled water.

In the second method, 60 to 100 mesh Teflon is added to a 5% v./v. solution of amine hydrochloride in toluene or other suitable diluent and allowed to stand for about 16 hours. This is then added to a glass column with a glass wool plug used to contain the support. The interstitial amine hydrochloric acid in toluene is displaced by passing 2 M hydrochloric acid which has been equilibrated with amine through the column.

The columns may be used to separate sulfonic acids from sulfuric acids and sulfates by passing an aqueous solution containing the acids and sulfates through the column so that the sulfonic acids are retained upon the inert material. After passing water through the column to remove any excess sulfuric acid which may be present, the sulfonic acids as its salt are eluted by passing an aqueous solution of NaOH or other suitable base through the column.

The following examples are given as illustrative of the method of this invention and are not to be taken as limiting the scope or extent of the invention.

EXAMPLE I

One millimole of 2-naphthol 8-sulfonic acid was dissolved in 20 ml. of an aqueous solution containing 9.63 millimoles of sulfuric acid. The aqueous solution was taken in a separatory funnel with 20 ml. of a toluene solution containing 5% Alamine 336 hydrochloride. The layers were separated and the organic layer washed with water to remove any excess sulfuric acid. The organic phase was then contacted with 10 ml. of an aqueous solution containing 0.2 M sodium hydroxide to recover the sulfonic acid as the sodium salt.

Upon completion, it was found that 92.5% of the sulfonic acid present was extracted from the aqueous solution in one extraction step. 100% recovery of sulfonic acid was attained in the back-extraction step. 97.9% of the $H_2SO_4$ was recovered after one wash.

EXAMPLE II 50 millimoles of paratoluene sulfonic acid were dissolved in 50 ml. of an aqueous 2 M sulfuric acid solution. This was shaken in a separatory funnel with 50 ml. of a toluene solution containing 50% v./v. Alamine 336. The phases were separated and the organic layer was washed with 50 ml. of water to remove any excess sulfuric acid which might be present. The aqueous solution was then contacted with 50 ml. of a second organic solution to effect a two-stage extraction.

Analysis showed that 81% of the sulfonic acid was extracted in the first extraction step and that the total sulfonic acid recovery in the two steps was 99.7%. 99.4% of the sulfuric acid remained in the aqueous solutions after the extraction.

EXAMPLE III

One millimole of toluene sulfonic acid was dissolved in 20 ml. of an aqueous solution containing 9.63 millimoles of sulfuric acid. Two extraction steps were made as before with 5% v./v. Alamine 336 in toluene. Analysis of the organic phase revealed that 98.2% of the sulfonic acid was recovered in two extraction steps and that 97.2% of the sulfuric acid was retained in the aqueous solution. The sulfonic acid was back-extracted by contacting the organic solution with 10 ml. of 0.2 M NaOH which yielded a 99.7% recovery.

EXAMPLE IV 100 ml. of a 2 M sulfuric acid solution containing 17.2 grams paratoluene sulfonic acid was contacted with 100 ml. of a 15% v./v. solution of Alamine 336 in toluene. The layers were separated and the organic phase washed three times with 100 ml. $H_2O$ to remove any excess sulfuric acid. The aqueous solution was analyzed and it was determined that 100% of the sulfuric acid was recovered.

It will be understood that the invention is not to be limited to the details given herein but that it may be modified within the scope of the appended claim.

The embodiments of the invention in which an exclusive property or privilege is claimed are defined as follows:

1. A method of separating a water-soluble aromatic sulfonic acid from sulfuric acid contained in an aqueous solution comprising: contacting said aqueous solution with a long-chain tertiary alkyl amine having 15–35 carbon atoms, said amine being present in a concentration of 5–50% by volume in an inert organic solvent selected from the group consisting of chloroform, ethyl acetate, nitrobenzene, toluene and cyclohexane, at least one mole of said amine being present per mol of sulfonic acid, whereby the sulfonic acid is taken up by the amine and forms a salt therewith, separating the resulting organic phase containing said amine sulfonic acid salt from the aqueous phase containing the sulfuric acid and back-extracting the sulfonic acid as its alkali metal salt from said organic phase by contacting said organic phase with an aqueous solution of an alkali metal hydroxide.

References Cited
UNITED STATES PATENTS

| | | | |
|---|---|---|---|
| 2,278,163 | 3/1942 | De Groote | 260—504 S |
| 2,321,496 | 6/1943 | Liberthson | 260—504 R |
| 2,692,278 | 10/1954 | Duncan | 260—504 R |

LEON ZITVER, Primary Examiner

A. SIEGEL, Assistant Examiner